F. Schlick,
Stopper Fastener,
N° 49,793. Patented Sep. 5, 1865.

Witnesses,
Thos. Geo Harrold
Chas H Smith

Inventor;
Frederick Schlick

UNITED STATES PATENT OFFICE.

FREDRICK SCHLICH, OF NEW YORK, N. Y.

IMPROVED STOPPER FOR BOTTLES.

Specification forming part of Letters Patent No. 49,793, dated September 5, 1865.

*To all whom it may concern:*

Be it known that I, FREDRICK SCHLICH, of the city and State of New York, have invented, made, and applied to use a certain new and useful Improvement in Stoppers for Bottles; and I do hereby declare the following to be a full, clear, and exact description of my said invention, reference being had to the annexed drawings, making part of this specification, wherein—

Figure 1:
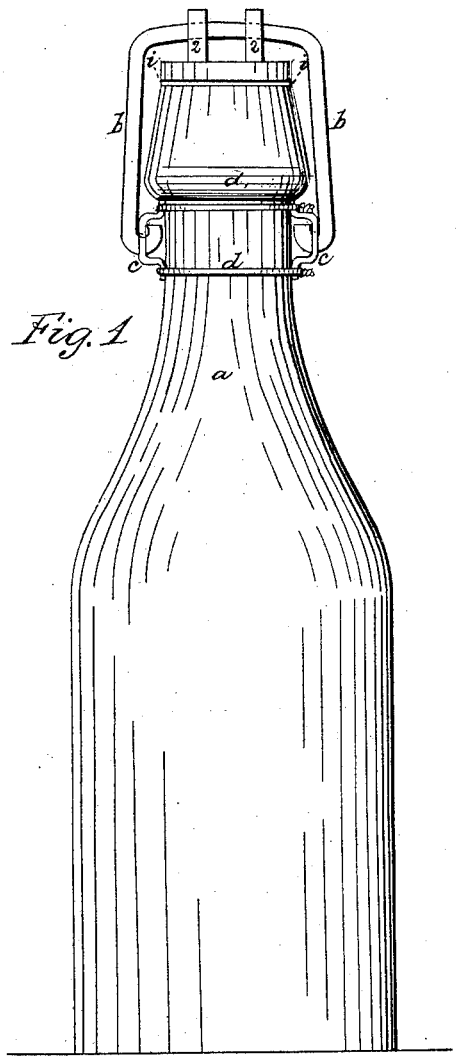
Figure 2:
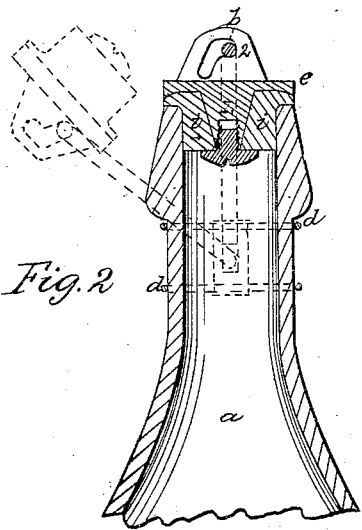
Figure 3:
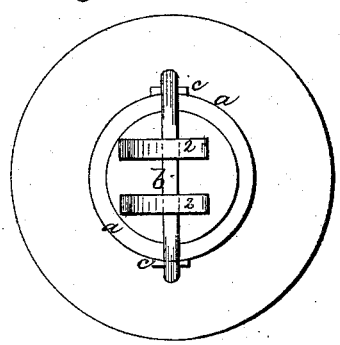

Figure 1 is an elevation of the stopper as in a bottle-neck. Fig. 2 is a section of the same, showing also the stopper thrown back by the red lines; and Fig. 3 is a plan of the stopper as closed.

Similar marks of reference denote the same parts.

The nature of my said invention consists in a peculiarly-constructed elastic stopper combined with a swinging bail and cam-shaped projections, by means of which the stopper is pressed down securely and held in place or easily relieved, so that the stopper can be released and turned back for opening the bottle.

In the drawings, $a$ represents a portion of the neck of a bottle.

$b$ is a bail, secured by fulcrum-loops $c$, that are clamped to the sides of the bottle-neck by the wires $d$, the ends of these loops $c$ setting below the shoulder or head of the bottle. These fulcrum-loops are easily made and attached, and will allow the bail to swing in either direction, which is not the case with the wire loops heretofore employed.

$e$ is a metallic or other button, formed with a tapering projection, 1, on one side and with a slotted or cam-shaped wing, 2, on the upper side. I have shown two of these wings on said button; but only one might be employed.

Around the projection 1 is a flanged rubber stopper, $i$, secured by the screw $o$ that enters said projection 1. The size of this rubber or elastic stopper $i$ corresponds with the smaller sizes of bottle-mouths, into which it is adapted to set. The mouths of bottles of a given character vary slightly in size; hence I provide the tapering projection 1 and screw $o$, so as to adapt my improvement to such variations, for by screwing in the screw $o$ the elastic stopper will be enlarged by compression and by the taper of the projection 1. By this means I am enabled to easily fit the stopper to the size of the mouth, while its flange sets upon the end of the neck, thus furnishing a double security. The bail $b$ passes through the slot in the wing 2, and said slot, being L-shaped, forms a cam. When the stopper is forced into the bottle the bail is turned into the horizontal position of the slot and holds the stopper firmly in place. When the bottle is to be opened the said bail is pushed back into the vertical portion of the slot, which relieves said stopper, allowing it to draw out and turn back with the bail, as seen by red lines in Fig. 2.

This improvement is especially adapted to bottles for ale, porter, beer, and other liquids that are not filled under pressure, but require to be closed securely. I do not, however, limit my invention to use with any particular character of liquid.

What I claim, and desire to secure by Letters Patent, is—

1. Securing the swinging bail by the fulcrum-loops, formed and secured in the manner set forth.

2. The elastic stopper, in combination with the tapering projection 1 and screw $o$, as and for the purposes specified.

3. The swinging bail, in combination with the elastic stopper and wing or wings 2, as and for the purposes specified.

4. The stopper, formed of india-rubber, with a flange to take the top of the bottle, and the cylindrical portion entering the neck, so as to render the stopper tight, as set forth.

In witness whereof I have hereunto set my signature this 1st day of July, 1865.

FREDRICK SCHLICH.

Witnesses:
LEMUEL W. SERRELL,
CHAS. H. SMITH.